United States Patent
Singha et al.

(10) Patent No.: US 12,373,233 B2
(45) Date of Patent: Jul. 29, 2025

(54) LARGE MESSAGE PASSING BETWEEN CONTAINERS IN A VIRTUALIZED COMPUTING SYSTEM

(71) Applicant: VMWARE, INC., Palo Alto, CA (US)

(72) Inventors: Zubraj Singha, Bangalore (IN); Siddhant Gupta, Alipurduar (IN)

(73) Assignee: VMware LLC, Palo Alto, CA (US)

( * ) Notice: Subject to any disclaimer, the term of this patent is extended or adjusted under 35 U.S.C. 154(b) by 650 days.

(21) Appl. No.: 17/467,485

(22) Filed: Sep. 7, 2021

(65) Prior Publication Data
US 2023/0014973 A1  Jan. 19, 2023

(30) Foreign Application Priority Data
Jul. 9, 2021 (IN) .............................. 202141030853

(51) Int. Cl.
*G06F 9/455* (2018.01)
(52) U.S. Cl.
CPC ............... *G06F 9/45558* (2013.01); *G06F 2009/45583* (2013.01)
(58) Field of Classification Search
None
See application file for complete search history.

(56) References Cited

U.S. PATENT DOCUMENTS

| | | | |
|---|---|---|---|
| 9,342,253 B1* | 5/2016 | Muthukkaruppan | ........................ G06F 3/0608 |
| 10,409,629 B1* | 9/2019 | Natanzon | ............ G06F 9/45558 |
| 2014/0201431 A1* | 7/2014 | Woo | ........................ G06F 3/064 711/103 |
| 2016/0266800 A1* | 9/2016 | Klee | ..................... G06F 3/0673 |
| 2018/0331969 A1* | 11/2018 | Chen | ..................... G06F 9/5083 |
| 2020/0396306 A1* | 12/2020 | Jaltade | ................. G06F 9/5077 |
| 2022/0155992 A1* | 5/2022 | Nortman | ................. G06F 9/544 |
| 2022/0327009 A1* | 10/2022 | Beard | ................. G06F 12/1009 |

* cited by examiner

*Primary Examiner* — Wynuel S Aquino
(74) *Attorney, Agent, or Firm* — Kim & Stewart LLP

(57) ABSTRACT

Large message passing between containers in a virtualized computing system is described. A method of communication between microservices executing in containers, which execute in at least one virtual machines (VM) of a host having a hypervisor supporting the at least one VM, includes: sending, by each of a first microservice in a first container and a second microservice in a second container, a request to create a communication channel to a broker daemon executing in the hypervisor; receiving, at each of the first and second microservices, an identifier of a virtual disk attached to the at least one VM by the broker daemon; writing, by the first microservice, a message to the virtual disk; and reading, by the second microservice, the message from the virtual disk.

21 Claims, 7 Drawing Sheets and hard# LARGE MESSAGE PASSING BETWEEN CONTAINERS IN A VIRTUALIZED COMPUTING SYSTEM

RELATED APPLICATION

Benefit is claimed under 35 U.S.C. 119(a)-(d) to Foreign Application Serial No. 202141030853 filed in India entitled "LARGE MESSAGE PASSING BETWEEN CONTAINERS IN A VIRTUALIZED COMPUTING SYSTEM", on Jul. 9, 2021, by VMware, Inc., which is herein incorporated in its entirety by reference for all purposes.

Applications today are deployed onto a combination of virtual machines (VMs), containers, application services, and more implemented in a virtualized computing system. For deploying such applications, a container orchestrator (CO) known as Kubernetes® has gained in popularity among application developers. Kubernetes provides a platform for automating deployment, scaling, and operations of application containers across clusters of hosts. It offers flexibility in application development and offers several useful tools for scaling.

Containers deployed in a virtualized computing system can execute multiple microservices. Communication between the microservices involves the use of a representational state transfer (REST) application programing interface (API) and hypertext transfer protocol secure (HTTPS) connections. Such communication consumes network stack and memory resources. Attempting to transfer a large amount of data between microservices can quickly consume such network and memory resources, in some cases completely depleting those resources or in worst case requiring more of those resources than available. It is desirable to provide an improved communication mechanism between containerized microservices, particularly for the transfer of large amounts of data.

SUMMARY

Large message passing between containers in a virtualized computing system is described. A method of communication between microservices executing in containers, which execute in at least one virtual machines (VM) of a host having a hypervisor supporting the at least one VM, includes: sending, by each of a first microservice in a first container and a second microservice in a second container, a request to create a communication channel to a broker daemon executing in the hypervisor; receiving, at each of the first and second microservices, an identifier of a virtual disk attached to the at least one VM by the broker daemon; writing, by the first microservice, a message to the virtual disk; and reading, by the second microservice, the message from the virtual disk.

Further embodiments include a non-transitory computer-readable storage medium comprising instructions that cause a computer system to carry out the above methods, as well as a computer system configured to carry out the above methods.

DETAILED DESCRIPTION

Figure 1:
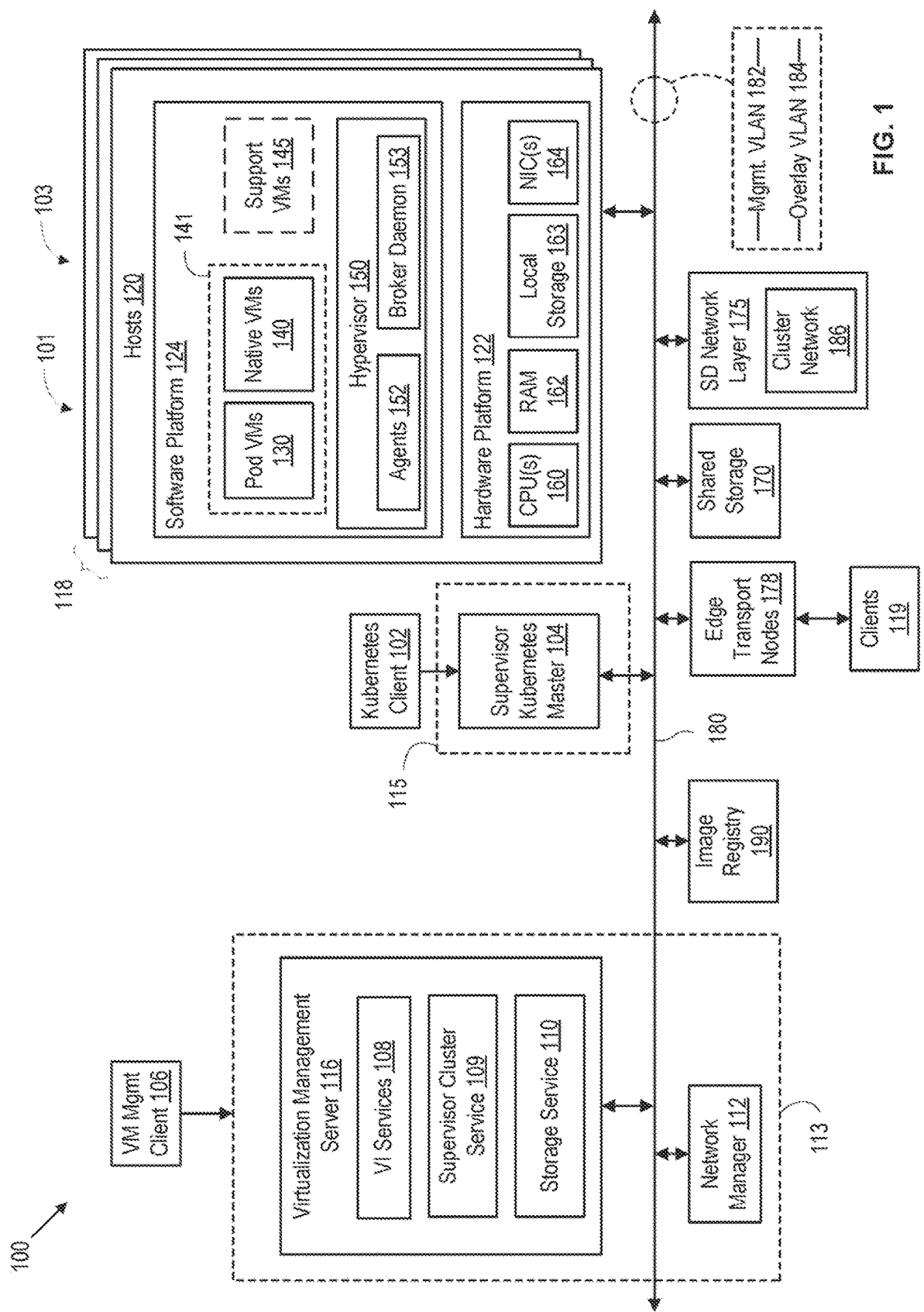
FIG. 1 is a block diagram of a virtualized computing system in which embodiments described herein may be implemented.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of VLANs to provide external network virtualization as described further herein.

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.), Local storage 163 in each host 120 can be aggregated and provisioned as part of a virtual SAN (vSAN), which is another form of shared storage 170. Virtualization management server 116 can select which local storage devices in hosts 120 are part of a vSAN for host cluster 118. In further embodiments described herein, virtualization management server 116 can omit some local storage devices from the vSAN for host cluster 118 for use as direct-attach storage. A user can request direct-attach storage for an application, as described further herein.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hyper-visor 150 abstracts processor, memory, storage, and network resources of hardware platform 122 to provide a virtual machine execution space within which multiple virtual machines (VM) may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, CA.

In the example of FIG. 1, host cluster 118 is enabled as a "supervisor cluster," described further herein, and thus VMs executing on each host 120 include pod VMs 130 and native VMs 140. A pod VM 130 is a virtual machine that includes a kernel and container engine that supports execution of containers, as well as an agent (referred to as a pod VM agent) that cooperates with a controller of an orchestration control plane 115 executing in hypervisor 150 (referred to as a pod VM controller). An example of pod VM 130 is described further below with respect to FIG. 2. VMs 130/140 support applications 141 deployed onto host cluster 118, which can include containerized applications (e.g., executing in either pod VMs 130 or native VMs 140) and applications executing directly on guest operating systems (non-containerized) (e.g., executing in native VMs 140). One specific application discussed further herein is a guest cluster executing as a virtual extension of a supervisor cluster. Some VMs 130/140, shown as support VMs 145, have specific functions within host cluster 118. For example, support VMs 145 can provide control plane functions, edge transport functions, and the like. An embodiment of software platform 124 is discussed further below with respect to FIG. 2.

Host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc, Logical network services include logical switches, logical routers, logical firewalls, logical virtual private networks (VPNs), logical load balancers, and the like, implemented on top of the virtualized infrastructure. In embodiments, virtualized computing system 100) includes edge transport nodes 178 that provide an interface of host cluster 118 to an external network (e.g., a corporate network, the public Internet, etc.). Edge transport nodes 178 can include a gateway between the internal logical networking of host cluster 118 and the external network. Edge transport nodes 178 can be physical servers or VMs. For example, edge transport nodes 178 can be implemented in support VMs 145 and include a gateway of SD network layer 175. Various clients 119 can access service(s) in virtualized computing system through edge transport nodes 178 (including VM management client 106 and Kubernetes client 102, which as logically shown as being separate by way of example).

Virtualization management server 116 is a physical or virtual server that manages host cluster 118 and the virtualization layer therein. Virtualization management server 116 installs agent(s) 152 in hypervisor 150 to add a host 120 as a managed entity. Virtualization management server 116 logically groups hosts 120 into host cluster 118 to provide chaster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualization management server 116 further enables host cluster 118 as a supervisor cluster 101. Virtualization management server 116 installs additional agents 152 in hypervisor 150 to add host 120 to supervisor cluster 101. Supervisor cluster 101 integrates an orchestration control plane 115 with host cluster 118. In embodiments, orchestration control plane 115 includes software components that support a container orchestrator, such as Kubernetes, to deploy and manage applications on host cluster 118. By way of example, a Kubernetes container orchestrator is described herein. In supervisor cluster 101, hosts 120 become nodes of a Kubernetes cluster and pod VMs 130 executing on hosts 120 implement Kubernetes pods. Orchestration control plane 115 includes supervisor Kubernetes master 104 and agents 152 executing in virtualization layer (e.g., hypervisors 150). Supervisor Kubernetes master 104 includes control plane components of Kubernetes, as well as custom controllers, custom plugins, scheduler extender, and the like that extend Kubernetes to interface with virtualization management server 116 and the virtualization layer. For purposes of clarity, supervisor Kubernetes master 104 is shown as a separate logical entity. For practical implementations, supervisor Kubernetes master 104 is implemented as one or more VM(s) 130/140 in host cluster 118. Further, although only one supervisor Kubernetes master 104 is shown, supervisor cluster 101 can include more than one supervisor Kubernetes master 104 in a logical cluster for redundancy and load balancing.

In an embodiment, virtualized computing system 100 further includes a storage service 110 that implements a storage provider in virtualized computing system 100 for container orchestrators. In embodiments, storage service 110 manages lifecycles of storage volumes (e.g., virtual disks) that back persistent volumes used by containerized applications executing in host cluster 118. A container orchestrator such as Kubernetes cooperates with storage service 110 to provide persistent storage for the deployed applications. In the embodiment of FIG. 1, supervisor Kubernetes master 104 cooperates with storage service 110 to deploy and manage persistent storage in the supervisor cluster environment. Other embodiments described below include a vanilla container orchestrator environment and a guest cluster environment. Storage service 110 can execute in virtualization management server 116 as shown or operate independently from virtualization management server 116 (e.g., as an independent physical or virtual server).

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents 152 in hypervisor 150 to add a host 120 as a managed entity, referred to as a transport node. In this manner, host cluster 118 can be a cluster 103 of transport nodes. One example of an SD networking platform that can be configured and used in embodiments described herein as network manager 112 and SD network layer 175 is a VMware NSX® platform made commercially available by VMware, Inc. of Palo Alto, CA.

Network manager 112 can deploy one or more transport zones in virtualized computing system 100, including VLAN transport zone(s) and an overlay transport zone. A VLAN transport zone spans a set of hosts 120 (e.g., host cluster 118) and is backed by external network virtualization of physical network 180 (e.g., a VLAN). One example VLAN transport zone uses a management VLAN 182 on physical network 180 that enables a management network connecting hosts 120 and the VI control plane (e.g., virtualization management server 116 and network manager 112). An overlay transport zone using overlay VLAN 184 on physical network 180 enables an overlay network that spans a set of hosts 120 (e.g., host cluster 118) and provides internal network virtualization using software components (e.g., the virtualization layer and services executing in VMs). Host-to-host traffic for the overlay transport zone is carried by physical network 180 on the overlay VLAN 184 using layer-2-over-layer-3 tunnels. Network manager 112 can configure SD network layer 175 to provide a cluster network 186 using the overlay network. The overlay transport zone can be extended into at least one of edge transport nodes 178 to provide ingress/egress between cluster network 186 and an external network.

In an embodiment, system 100 further includes an image registry 190. As described herein, containers of supervisor cluster 101 execute in pod VMs 130. The containers in pod VMs 130 are spun up from container images managed by image registry 190. Image registry 190 manages images and image repositories for use in supplying images for containerized applications.

Virtualization management server 116 and network manager 112 comprise a virtual infrastructure (VI) control plane 113 of virtualized computing system 100. Virtualization management server 116 can include a supervisor cluster service 109, storage service 110, and VI services 108. Supervisor cluster service 109 enables host cluster 118 as supervisor cluster 101 and deploys the components of orchestration control plane 115. VI services 108 include various virtualization management services, such as a distributed resource scheduler (DRS), high-availability (HA) service, single sign-on (SSO) service, virtualization management daemon, and the like. DRS is configured to aggregate the resources of host cluster 118 to provide resource pools and enforce resource allocation policies. DRS also provides resource management in the form of load balancing, power management, VM placement, and the like. HA service is configured to pool VMs and hosts into a monitored cluster and, in the event of a failure, restart VMs on alternate hosts in the cluster. A single host is elected as a master, which communicates with the HA service and monitors the state of protected VMs on subordinate hosts. The HA service uses admission control to ensure enough resources are reserved in the cluster for VM recovery when a host fails. SSO service comprises security token service, administration server, directory service, identity management service, and the like configured to implement an SSO platform for authenticating users. The virtualization management daemon is configured to manage objects, such as data centers, clusters, hosts, VMs, resource pools, datastores, and the like.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, enable supervisor cluster 101, deploy and manage image registry 190, and the like.

Kubernetes client 102 represents an input interface for a user to supervisor Kubernetes master 104. For example, Kubernetes client 102 can be kubectl. Through Kubernetes client 102, a user submits desired states of the Kubernetes system, e.g., as YAML documents, to supervisor Kubernetes master 104. In embodiments, the user submits the desired states within the scope of a supervisor namespace. A "supervisor namespace" is a shared abstraction between VI control plane 113 and orchestration control plane 115. Each supervisor namespace provides resource-constrained and authorization-constrained units of multi-tenancy. A supervisor namespace provides resource constraints, user-access constraints, and policies (e.g., storage policies, network policies, etc.). Resource constraints can be expressed as quotas, limits, and the like with respect to compute (CPU and memory), storage, and networking of the virtualized infrastructure (host cluster 118, shared storage 170, SD network layer 175). User-access constraints include definitions of users, roles, permissions, bindings of roles to users, and the like. Each supervisor namespace is expressed within orchestration control plane 115 using a namespace native to orchestration control plane 115 (e.g., a Kubernetes namespace or generally a "native namespace"), which allows users to deploy applications in supervisor cluster 101 within the scope of supervisor namespaces. In this manner, the user interacts with supervisor Kubernetes master 104 to deploy applications in supervisor cluster 101 within defined supervisor namespaces.

While FIG. 1 shows an example of a supervisor cluster 101 the techniques described herein do not require a supervisor cluster 101. In some embodiments, host cluster 118 is not enabled as a supervisor cluster 101. In such case, supervisor Kubernetes master 104, Kubernetes client 102, pod VMs 130, supervisor cluster service 109, and image registry 190 can be omitted. While host cluster 118 is show as being enabled as a transport node cluster 103, in other embodiments network manager 112 can be omitted. In such case, virtualization management server 116 functions to configure SD network layer 175.

In embodiments, containers execute in either pod VMs 130 or native VMs 140 in a host 120 and include microservices configured to communicate among one another. For example, a pair of containers can execute in a pair of pod VMs 130 on a host 120. In another example, a pair of containers can execute in a pair of native VMs 140 on a host 120 or in one pod VM 130 and one native VM 140. In another example, a pair of containers can execute in the same native VM 140 or the same pod VM 130. In general, a pair of containers execute on the same host 120 in one or more VMs 130/140. The containers include microservices configured for communication through a communication channel described further herein. The communication channel can be half duplex or full duplex. In embodiments, the communication channel is implemented using a virtual disk, which can be provisioned in local storage 163 or shared storage 170. In embodiments, the virtual disk is provisioned as a persistent volume managed by the container orchestration system. Creation and management of the communication channel is handled by a broker daemon 153 executing in hypervisor 150. Containerized microservices send requests for channel creation to broker daemon 153, which in turn creates a channel using a virtual disk. Broker daemon 153 attaches the virtual disk to the VM(s) 130/140 for use by the microservices in sending and receiving messages. A sending microservice writes a message to the virtual disk, and a receiving microservice reads the message from the virtual disk. This obviates the need to use the network stack in order to exchange messages between microservices executing on a host 120, conserving network resources.

Figure 2:
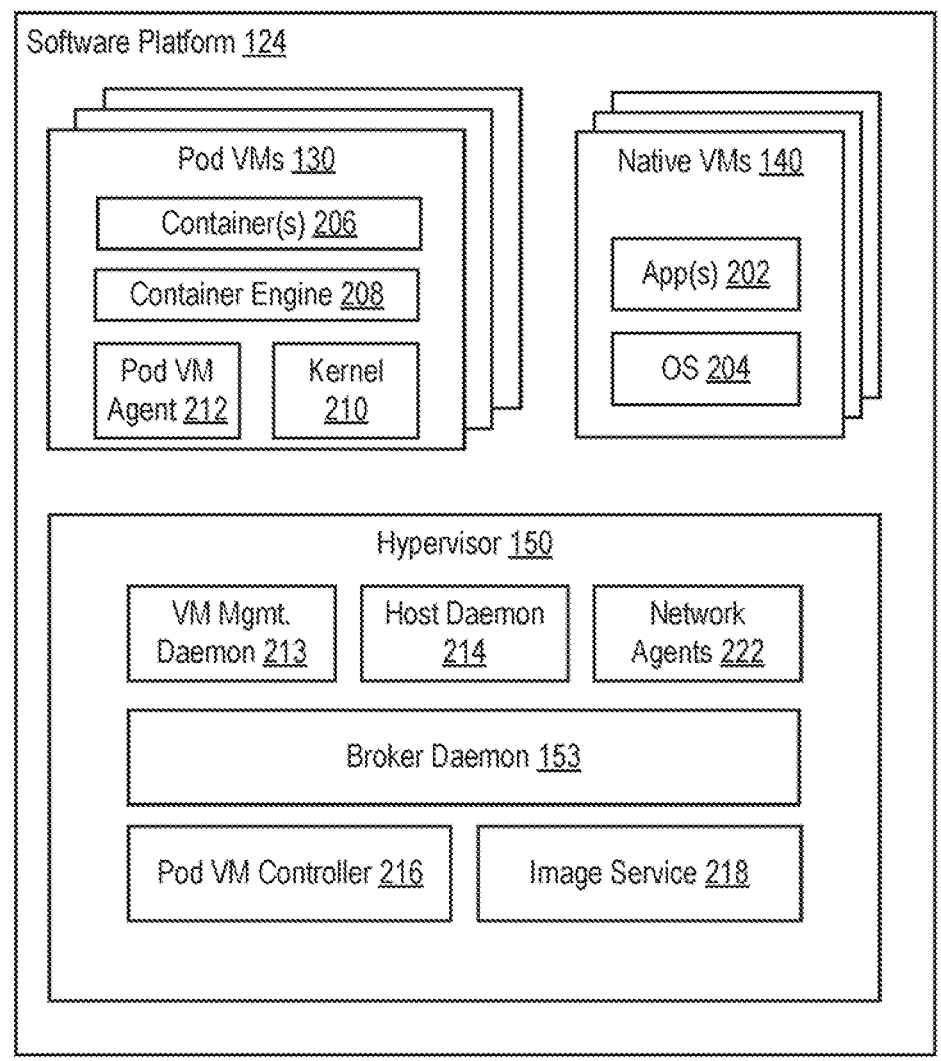
FIG. 2 is a block diagram depicting a software platform according to an embodiment.

FIG. 2 is a block diagram depicting software platform 124 according to an embodiment. As described above, software platform 124 of host 120 includes hypervisor 150 that supports execution of VMs, such as pod VMs 130, native VMs 140, and support VMs 145. In an embodiment, hypervisor 150 includes a VM management daemon 213, a host daemon 214, a pod VM controller 216, an image service 218, broker daemon 153, and network agents 222. VM management daemon 213 is an agent 152 installed by virtualization management server 116. VM management daemon 213 provides an interface to host daemon 214 for virtualization management server 116. Host daemon 214 is configured to create, configure, and remove VMs (e.g., pod VMs 130 and native VMs 140).

Pod VM controller 216 is an agent 152 of orchestration control plane 115 for supervisor cluster 101 and allows supervisor Kubernetes master 104 to interact with hypervisor 150. Pod VM controller 216 configures the respective host as a node in supervisor cluster 101. Pod VM controller 216 manages the lifecycle of pod VMs 130, such as determining when to spin-up or delete a pod VM. Pod VM controller 216 also ensures that any pod dependencies, such as container images, networks, and volumes are available and correctly configured. Pod VM controller 216 is omitted if host cluster 118 is not enabled as a supervisor cluster 101.

Image service 218 is configured to pull container images from image registry 190 and store them in shared storage 170 such that the container images can be mounted by pod VMs 130. Image service 218 is also responsible for managing the storage available for container images within shared storage 170. This includes managing authentication with image registry 190, assuring providence of container images by verifying signatures, updating container images when necessary, and garbage collecting unused container images. Image service 218 communicates with pod VM controller 216 during spin-up and configuration of pod VMs 130. In some embodiments, image service 218 is part of pod VM controller 216. In embodiments, image service 218 utilizes system VMs 130/140 in support VMs 145 to fetch images, convert images to container image virtual disks, and cache container image virtual disks in shared storage 170.

Network agents 222 comprises agents 152 installed by network manager 112. Network agents 222 are configured to cooperate with network manager 112 to implement logical network services. Network agents 222 configure the respective host as a transport node in a cluster 103 of transport nodes.

Each pod VM 130 has one or more containers 206 running therein in an execution space managed by container engine 208. The lifecycle of containers 206 is managed by pod VM agent 212. Both container engine 208 and pod VM agent 212 execute on top of a kernel 210 (e.g., a Linux® kernel). Each native VM 140 has applications 202 running therein on top of an OS 204. Native VMs 140 do not include pod VM agents and are isolated from pod VM controller 216. Container engine 208 can be an industry-standard container engine, such as libcontainer, runc, or containerd. Pod VMs 130, pod VM controller 216, and image service 218 are omitted if host cluster 118 is not enabled as a supervisor cluster 101.

In some embodiments, containers can also execute in native VMs 140. That is, a native VM 140 can include a container engine 208 similar to a pod VM 130. Native VMs 140 can execute containers alongside pod VMs 130. In some embodiments, host cluster 118 is not configured as a supervisor cluster and thus containers execute only in native VMs 140 (pod VMs 130 are not present unless enabled as a supervisor cluster).

Figure 3:
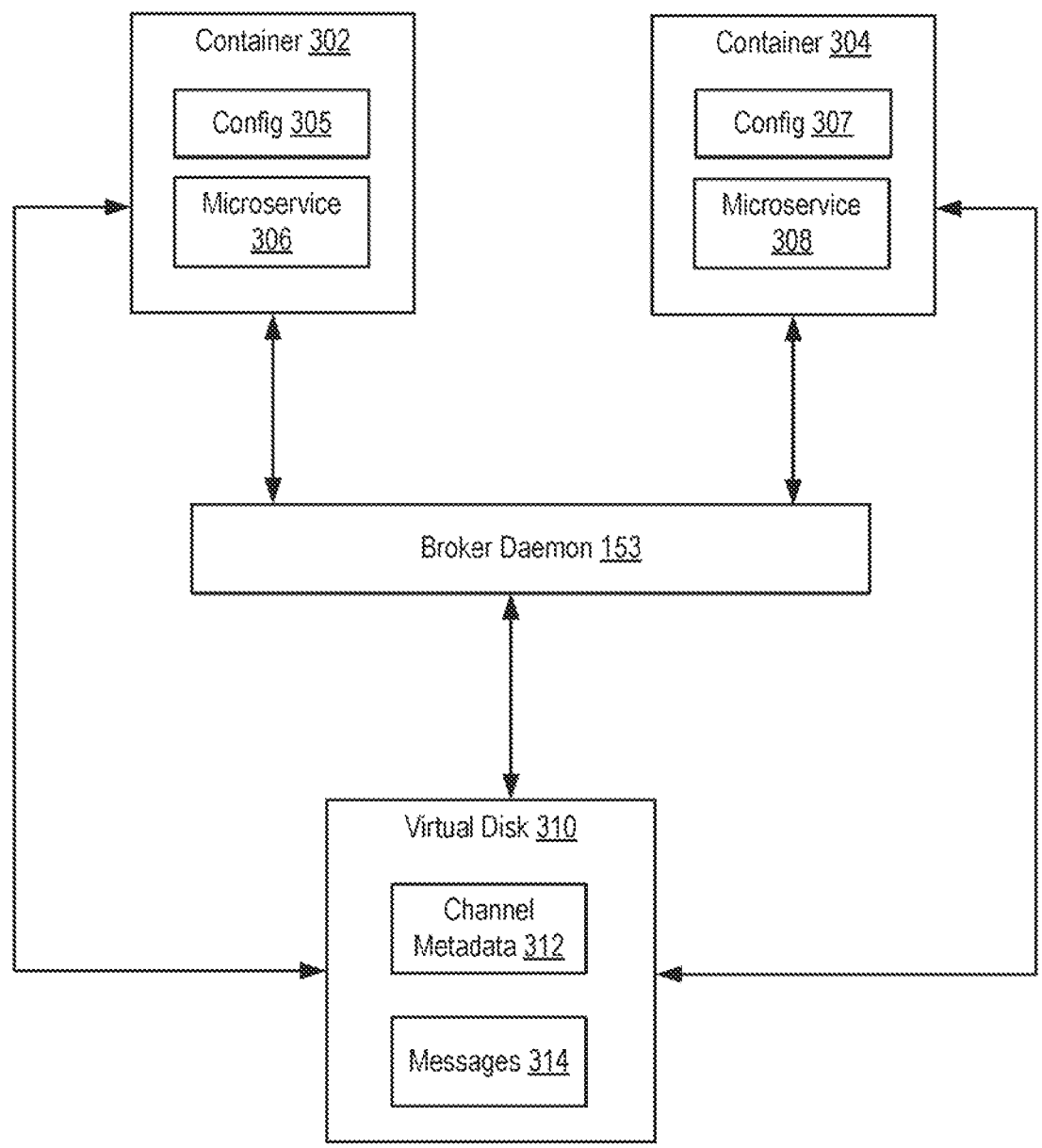
FIG. 3 is a block diagram depicting communication between containerized microservices according to an embodiment.

FIG. 3 is a block diagram depicting communication between containerized microservices according to an embodiment. Containers 302 and 304 are configured for half duplex or full duplex communication with one another. Containers 302 and 304 can execute in different VMs 130/140 or the same VM 130/140. Container 302 executes a microservice 306 and container 304 executes a microservice 308. Container 302 includes a configuration (config 305) and container 304 includes a configuration (config 307). Containers 302 and 304 communicate with broker daemon 153 to establish a communication channel implemented on a virtual disk 310. Config 305 and 307 include information that indicates use of the communication channel and the type of communication required (e.g., half duplex or full duplex). Containers 302 and 304 send requests to broker daemon 153 for creation of the communication channel. In turn, broker daemon 153 provisions virtual disk 310 and attaches virtual disk to the VM(s) 130/140. Broker daemon 153 generates channel metadata 312 which is stored on virtual disk 310. Thereafter, microservice 306 in container 302 and microservice 308 in container 304 communicate using messages 314 on virtual disk 310.

Figure 4:
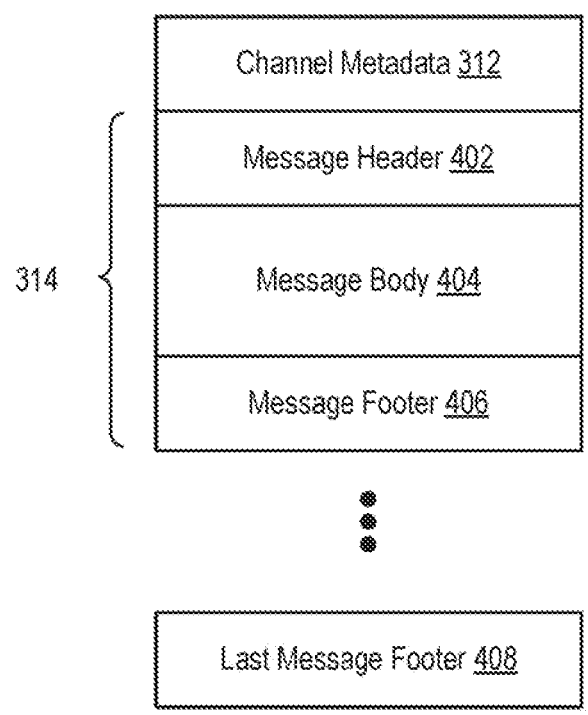
FIG. 4 is a block diagram showing the format of data stored on a virtual disk according to an embodiment.

FIG. 4 is a block diagram showing the format of data stored on virtual disk 310 according to an embodiment. Virtual disk 310 includes channel metadata 312 and message(s) 314. Each message 314 includes a message header 402, a message body 404, and a message footer 406. The last message 314 includes a last message footer 408.

In embodiments, channel metadata 312 is stored in a region at the beginning of virtual disk 310. Channel metadata can include various information, such as a lock field, version field, channel type, a channel identifier, creation time, number of current messages, offsets for the first message, last message, end of last message, and the like. An example data structure channelMeta is defined below:

```
struct channelMeta {
    uint8 metaLock; // lock which will be used for updating the channel
      metadata
    uint8 metaVersion; // note to check
    uint8 channelType ; // full or half
    uint64 channelHash[4]; // 256 byte to store sha 256 hash
    uint64 createTime;// time of creation
    uint64 noOfMessages; // number of messages in this channel
    uint64 startOffsetFirstMessage; // starting offset of the first message on
      the disk
     uint64 startOffsetLastMessage; // starting offset of the last message
    uint64 endOffsetLastMessage; // end offset of the last message
    uint64 starOffsetFirstReadMessage; // This field is filled only in case of
 full duplex communication.
} channelMeta_t;
```

Each message 314 includes a header and a footer. Message header 402 can include, for example, a length of the message. An example data structure messageHdr is defined below:

```
struct messageHdr {
    uint64 messageLen;
} messageHdr_t;
```

Message footer 406 can include, for example, an offset in the filesystem of virtual disk 310 (e.g., virtual machine file system (VMFS)) of the next message. An example data structure messageFooter is defined below:

```
struct messageFooter {
    uint64 nextMessageOffset;
} messageFooter_t;
```

The examples above assume a half duplex channel. In case of a full duplex channel, message header 402 includes an additional field that indicates the name of the sender. An example data structure messageHdr is defined below for full duplex communication:

```
struct messageHdr {
    uint8 sender;
    uint64 messageLen;
} messageHdr_t;
```

Figure 5:
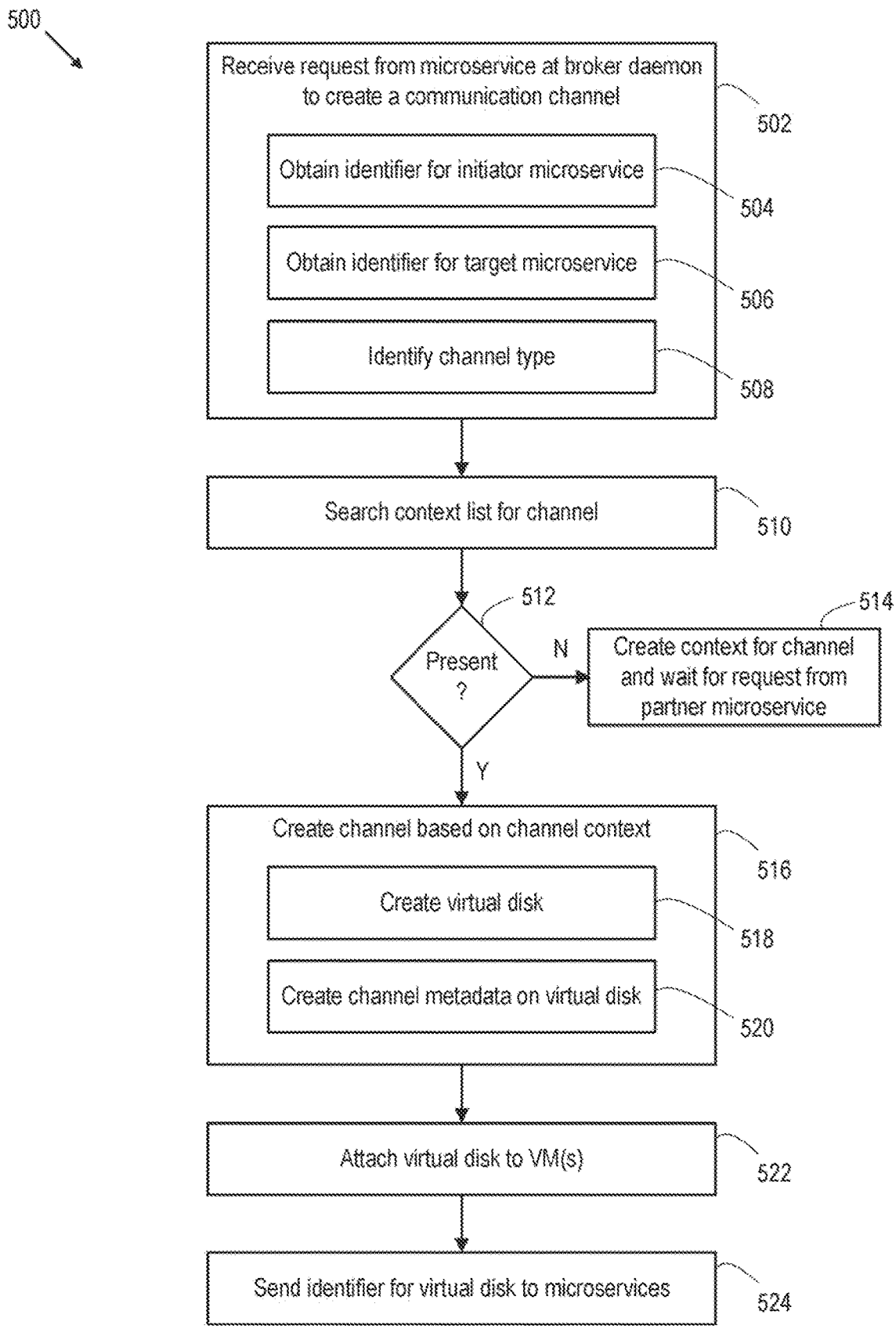
FIG. 5 is a flow diagram depicting a method of creating a communication channel between containerized microservices according to an embodiment.

FIG. 5 is a flow diagram depicting a method 500 of creating a communication channel between containerized microservices according to an embodiment. Method 500 begins at step 502, where broker daemon 153 receives a request from a microservice to create a communication channel. The request can include an identifier of the initiator microservice (e.g., the sender), an identifier of a target microservice (e.g., the receiver), and a channel type (e.g., half duplex or full duplex). Thus, at step 504, broker daemon 153 obtains an identifier for the initiator microservice. At step 506, broker daemon 1.53 obtains an identifier for the target microservice. At step 508, broker daemon 153 identifies a channel type.

At step 510, broker daemon 153 searches a context list for the channel. In embodiments, broker daemon 153 maintains a context list to keep track of communication channels created for containerized microservices. Each context includes information, such as the identifiers for the microservices, the channel type, an identifier of a virtual disk having the channel, and the like. When the request is received at step 502, either a context for the requested channel has already been created or there is no context for the requested channel. The context may have been created by the partner microservice (e.g., if the initiator is sending the request, the target may have already sent its request causing creation of the context). At step 512, broker daemon determines whether the context is present in the context list. If not, method 500 proceeds to step 514, where broker daemon creates the context for the channel and waits for the request from the partner microservice. If the context is present in the list, method 500 proceeds to strep 516.

At step 516, broker daemon 153 creates the channel based on the channel context. For example, at step 518, broker daemon 153 creates a virtual disk. At step 520, broker daemon 153 creates channel inetadata on the virtual disk. The structure of channel metadata is described above. At step 522, broker daemon 153 attaches the virtual disk to the VM(s) in which the containerized microservices are executing. At step 524, broker daemon 153 sends an identifier for the virtual disk to the microservices.

Figure 6:
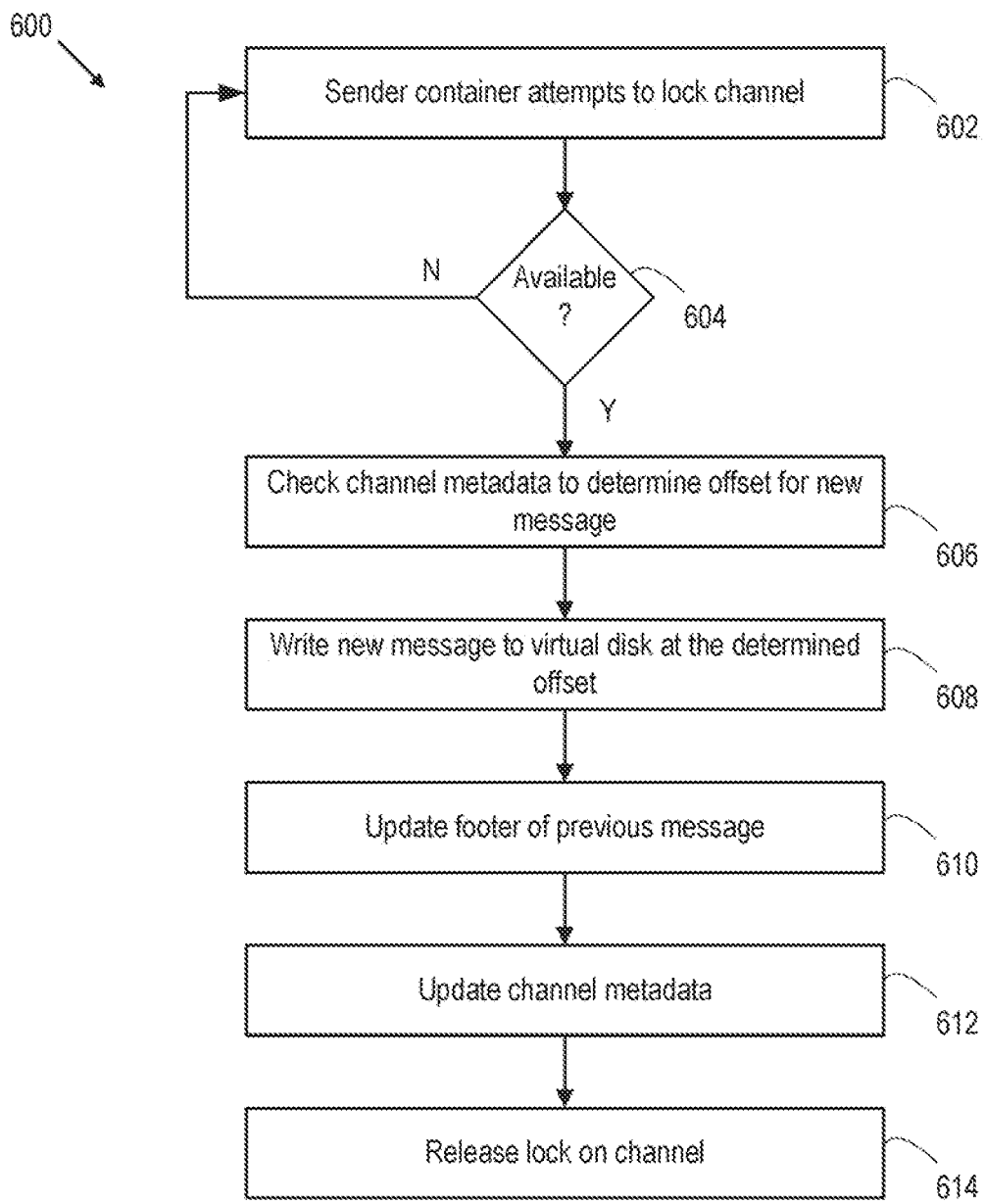
FIG. 6 is a flow diagram depicting a method of sending a message in a communication channel between containerized microservices according to an embodiment.

FIG. 6 is a flow diagram depicting a method 600 of sending a message in a communication channel between containerized microservices according to an embodiment. Method 600 begins at step 602, where the sender container (the container having the sending microservice) attempts to lock the channel. In embodiments, the sender container checks a lock field in channel metadata 312 to see if the channel is free for access. At step 604, the sender container determines if the lock is available to obtain. If not, method 600 returns to step 602. Otherwise, the sender container Obtains the lock and proceeds to step 606.

At step 606, the sender container checks channel metadata 312 to determine an offset for storing the new message. The offset is defined with respect to the file system of the virtual disk (e.g., VMFS). The offset can be determined by first checking the number of messages. If the number of messages is zero, then the offset can be an address after the end of channel metadata 312, which has a known size (e.g., 4 KB). If the number of messages is greater than zero, the sender container checks for the start offset of the last message. The sender container then reads the header of the last message to obtain the length of the last message. The sender container can add the length of the last message to the offset of the last message to determine an offset for the new message.

At step 608, the sender container writes the new message on the virtual disk at the determine offset. At step 610, the sender container updates the footer of the previous message. In an embodiment, the last message includes a special footer having a designated value (rather than an offset of the next message). The sender container updates the footer of the previous message to include an offset of the new message. At step 612, the sender container updates the channel metadata (e.g., incrementing the number of messages, updating the offsets of the start and end of the last message, and the like. At step 614, the sender container releases the lock on the channel.

Figure 7:
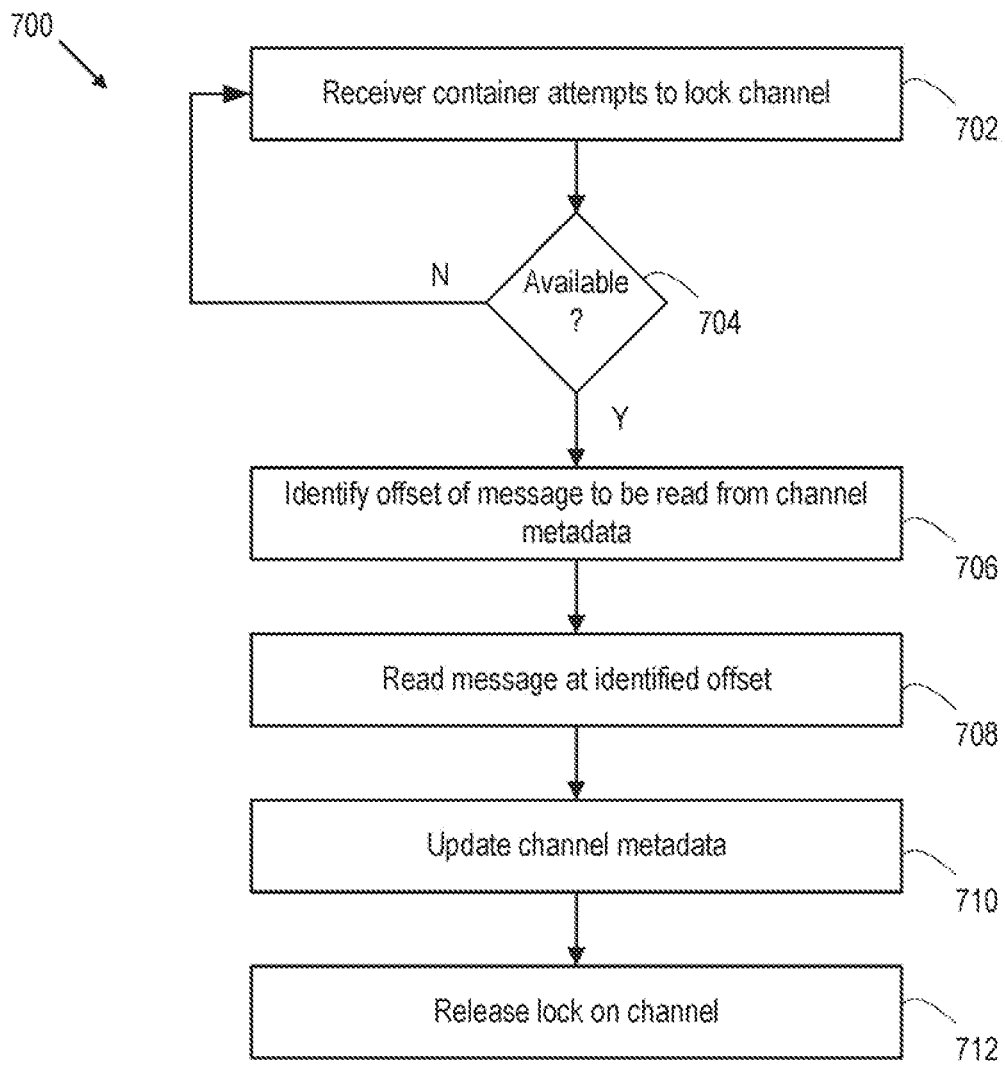
FIG. 7 is a flow diagram depicting a method of receiving a message in a communication channel between containerized microservices according to an embodiment.

FIG. 7 is a flow diagram depicting a method 700 of receiving a message in a communication channel between containerized microservices according to an embodiment. Method 700 begins at step 702, where the receiver container (the container having the receiving microservice) attempts to lock the channel. In embodiments, the receiver container checks a lock field in channel metadata 312 to see if the channel is free for access. At step 704, the receiver container determines if the lock is available to obtain. If not, method 700 returns to step 702. Otherwise, the receiver container obtains the lock and proceeds to step 706.

At step 706, the receiver container identifies the offset of the message to be read from the channel metadata. For example, the receiver container can check the start offset of the first message. At step 708, the receiver container reads the message at the identified offset. At step 710, the receiver container updates the channel metadata. For example, the receiver container can decrement the number of messages and change the starting offset of the first message to the next message (based on the footer of the message being read). At step 712, the receiver container releases the lock on the channel.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of communication between microservices executing in containers, which execute in at least one virtual machines (VM) of a host having a hypervisor supporting the at least one VM, the method comprising:
   sending, by each of a first microservice in a first container and a second microservice in a second container, a request to create a communication channel to a broker daemon executing in the hypervisor, the first and second microservices and the hypervisor comprising software executing on a hardware platform of the host having a central processing unit (CPU) and a system memory;
   provisioning, by the broker daemon, a virtual disk in local storage of the host or shared storage accessible by the host, the local storage or the shared storage comprising at least one hard disk drive or solid-state drive, the virtual disk having a file system;
   writing, by the broker daemon, data to the virtual disk to establish the communication channel between the first microservice and the second microservice;
   attaching, by the broker daemon, the virtual disk to the at least one VM;
   receiving, at each of the first and second microservices from the broker daemon, an identifier of the virtual disk attached to the at least one VM;
   writing, by the first microservice, a message to the virtual disk in the communication channel at an offset of the file system; and
   reading, by the second microservice, the message from the communication channel on the virtual disk.

2. The method of claim 1, wherein the data written to the virtual disk to establish the communication channel comprises channel metadata created by the broker daemon, and wherein the step of writing comprises:
   reading, by the first container, the channel metadata to obtain a lock on the communication channel;
   checking, by the first container, the channel metadata to determine the offset at which to store the message; and
   storing, by the first microservice, the message to the virtual disk at the determined offset.

3. The method of claim 2, wherein the step of writing the message further comprises:
   updating, by the first container, a footer of a previous message on the virtual disk;
   updating, by the first container, the channel metadata; and
   releasing, by the first container, the lock on the communication channel.

4. The method of claim 2, wherein the step of checking the channel metadata to determine the offset comprises:
   checking, by the first container, a number of messages to identify a last message;
   reading a header of the last message to obtain a length of the last message;
   adding the length of the last message to another offset of the last message in the file system to determine the offset.

5. The method of claim 1, wherein the data written to the virtual disk to establish the communication channel comprises channel metadata created by the broker daemon, and wherein the step of reading comprises:
   reading, by the second container, the channel metadata to obtain a lock on the communication channel;
   checking, by the second container, the channel metadata to determine the offset of the message to be read; and
   obtaining, by the second microservice, the message from the virtual disk at the determined offset.

6. The method of claim 5, wherein the step of reading the message further comprises:
   updating, by the second container, the channel metadata; and
   releasing, by the second container, the lock on the communication channel.

7. The method of claim 1, wherein the broker daemon maintains a context list, wherein the broker daemon creates a context for the communication channel in response to receiving the request from one of the first and second microservices, and wherein the broker daemon provisions the virtual disk in response to receiving the request from the other one of the first and second microservices.

8. The method of claim 7, wherein the broker daemon obtains, from each request, an identifier of the first microservice, an identifier of the second microservice, and a channel type.

9. A non-transitory computer readable medium comprising instructions to be executed in a computing device to cause the computing device to carry out a method of communication between microservices executing in containers, which execute in at least one virtual machines (VM) of a host having a hypervisor supporting the at least one VM, the method comprising:
   sending, by each of a first microservice in a first container and a second microservice in a second container, a request to create a communication channel to a broker daemon executing in the hypervisor, the first and second microservices and the hypervisor comprising software executing on a hardware platform of the host having a central processing unit (CPU) and a system memory;
   provisioning, by the broker daemon, a virtual disk in local storage of the host or shared storage accessible by the host, the local storage or the shared storage comprising at least one of hard disk drives or solid-state drives, the virtual disk having a file system;
   writing, by the broker daemon, data to the virtual disk to establish the communication channel between the first microservice and the second microservice;
   attaching, by the broker daemon, the virtual disk to the at least one VM;
   receiving, at each of the first and second microservices from the broker daemon, an identifier of the virtual disk attached to the at least one VM;
   writing, by the first microservice, a message to the virtual disk in the communication channel at an offset of the file system; and
   reading, by the second microservice, the message from the communication channel on the virtual disk.

10. The non-transitory computer readable medium of claim 8, wherein the data written to the virtual disk to establish the communication channel comprises channel metadata created by the broker daemon, and wherein the step of writing comprises:
   reading, by the first container, the channel metadata to obtain a lock on the communication channel;
   checking, by the first container, the channel metadata to determine the offset at which to store the message; and
   storing, by the first microservice, the message to the virtual disk at the determined offset.

11. The non-transitory computer readable medium of claim 10, wherein the step of writing the message further comprises:
   updating, by the first container, a footer of a previous message on the virtual disk;
   updating, by the first container, the channel metadata; and
   releasing, by the first container, the lock on the communication channel.

12. The non-transitory computer readable medium of claim 9, wherein the data written to the virtual disk to establish the communication channel comprises channel metadata created by the broker daemon, and wherein the step of reading comprises:
   reading, by the second container, the channel metadata to obtain a lock on the communication channel;
   checking, by the second container, the channel metadata to determine the offset of the message to be read; and
   obtaining, by the second microservice, the message from the virtual disk at the determined offset.

13. The non-transitory computer readable medium of claim 12, wherein the step of reading the message further comprises:
   updating, by the second container, the channel metadata; and
   releasing, by the second container, the lock on the communication channel.

14. The non-transitory computer readable medium of claim 9, wherein the broker daemon maintains a context list, wherein the broker daemon creates a context for the communication channel in response to receiving the request from one of the first and second microservices, and wherein the broker daemon provisions the virtual disk in response to receiving the request from the other one of the first and second microservices.

15. The non-transitory computer readable medium of claim 14, wherein the broker daemon obtains, from each request, an identifier of the first microservice, an identifier of the second microservice, and a channel type.

16. A virtualized computing system, comprising:
   a hardware platform having a central processing unit (CPU) and a system memory; and
   a hypervisor executing on the hardware platform, the hypervisor supporting execution of at least one virtual machine (VM), the at least one VM executing a first container having a first microservice and a second container having a second microservice, the hypervisor executing a broker daemon;
   wherein the first and second microservices are each configured to send a request to create a communication channel to the broker daemon;
   wherein the broker daemon is configured to provision a virtual disk in local storage of the host or shared storage accessible by the host, write data to the virtual disk to establish the communication channel between the first microservice and the second microservice, and attach the virtual disk to the at least one VM, the local storage or the shared storage comprising at least one of hard disk drives or solid-state drives, the virtual disk having a file system;
   wherein each of the first and second microservices is configured to receive an identifier of the virtual disk attached to the at least one VM by the broker daemon;
   wherein the first microservice is configured to write a message to the virtual disk in the communication channel at an offset of the file system; and
   wherein the second microservice is configured to read the message from the communication channel on the virtual disk.

17. The virtualized computing system of claim 16, wherein the data written to the virtual disk to establish the communication channel comprises channel metadata created by the broker daemon, and wherein the first microservice is configured to write the message by:
   reading the channel metadata to obtain a lock on the communication channel;
   checking the channel metadata to determine the offset at which to store the message; and
   storing the message to the virtual disk at the determined offset.

18. The virtualized computing system of claim 17, wherein the first microservice is further configured to:
   update a footer of a previous message on the virtual disk;

update the channel metadata; and release the lock on the communication channel.

19. The virtualized computing system of claim 16, wherein the data written to the virtual disk to establish the communication channel comprises channel metadata created by the broker daemon, and wherein the second microservice is configured to read the message by:

reading the channel metadata to obtain a lock on the communication channel;

checking the channel metadata to determine the offset of the message to be read; and obtaining the message from the virtual disk at the determined offset.

20. The virtualized computing system of claim 19, wherein second microservice is configured to:

update the channel metadata; and release the lock on the communication channel.

21. The virtualized computing system of claim 16, wherein the broker daemon maintains a context list, wherein the broker daemon creates a context for the communication channel in response to receiving the request from one of the first and second microservices, and wherein the broker daemon provisions the virtual disk in response to receiving the request from the other one of the first and second microservices.

* * * * *